US012766540B2

(12) United States Patent
Sandey et al.

(10) Patent No.: US 12,766,540 B2
(45) Date of Patent: Oct. 20, 2026

(54) SYSTEM AND METHOD FOR PERFORMING RINSING OPERATIONS ON AN AGRICULTURAL SPRAYER

(71) Applicant: CNH Industrial America LLC, New Holland, PA (US)

(72) Inventors: Mitchell Sandey, Manitowoc, WI (US); Jose Batz-Alvarado, Lyons, IL (US); Steven Winkel, Elkhart Lake, WI (US); Nathan Paul Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 577 days.

(21) Appl. No.: 18/209,796

(22) Filed: Jun. 14, 2023

(65) Prior Publication Data

US 2024/0416376 A1 Dec. 19, 2024

(51) Int. Cl.

*A01M 7/00* (2006.01)
*B05B 15/55* (2018.01)
*A01C 23/04* (2006.01)

(52) U.S. Cl.

CPC ........... *B05B 15/55* (2018.02); *A01M 7/0089* (2013.01); *A01C 23/04* (2013.01)

(58) Field of Classification Search

CPC . A01M 7/0042; A01M 7/0089; B05B 1/3093; B05B 14/00; B05B 15/55; A01C 23/04
See application file for complete search history.

(56) References Cited

U.S. PATENT DOCUMENTS

| | | | | |
|---|---|---|---|---|
| 10,369,585 | B2 | 8/2019 | Brooks et al. | |
| 10,631,531 | B2 | 4/2020 | Engelbrecht et al. | |
| 11,148,158 | B2 | 10/2021 | Engelbrecht et al. | |
| 2017/0006852 | A1* | 1/2017 | Engelbrecht ........ | A01M 7/0089 |
| 2019/0022687 | A1* | 1/2019 | Brooks ............... | A01M 7/0089 |

* cited by examiner

*Primary Examiner* — Tuongminh N Pham
(74) *Attorney, Agent, or Firm* — Dority & Manning, P.A.

(57) ABSTRACT

The present subject matter is directed to a system and method for performing rinsing operations on an agricultural sprayer. The system includes a product tank and rinse tank configured to store liquids and a boom assembly including a nozzle configured to deliver liquid to a field. The system also includes a feed conduit configured to convey liquid to the nozzles, and a recirculation conduit configured to convey liquid from the boom assembly to the product tank. The system also includes a pump configured to pump liquid through the conduits. The system also includes a plurality of valves configured to regulate the flow of liquid through the conduits. The system also includes a computing system configured to receive an input to initiate a rinse cycle, control the valves to convey liquid through the recirculation conduit, and activate the pump during the rinse cycle such that liquid is conveyed through the system.

19 Claims, 4 Drawing Sheets

SYSTEM AND METHOD FOR PERFORMING RINSING OPERATIONS ON AN AGRICULTURAL SPRAYER

FIELD OF THE INVENTION

The present disclosure generally relates to agricultural sprayers and, more particularly, to systems and methods for performing rinsing operations on an agricultural sprayer.

BACKGROUND OF THE INVENTION

Agricultural sprayers apply an agricultural fluid (e.g., a pesticide, a nutrient, and/or the like) onto a field across which the sprayer is traveling. As such, a typical sprayer includes a boom assembly on which a plurality of spaced apart nozzles is mounted. Each nozzle is, in turn, configured to dispense or otherwise spray the agricultural fluid onto the underlying plants (e.g., crops, weeds, etc.) and/or soil. In this respect, the sprayer includes a product delivery system including a pump and various valves to supply the agricultural fluid from a tank to the nozzles.

It is desirable to rinse the product delivery system from time to time with a rinse liquid, such as clean water. In this respect, systems for rinsing the product delivery system have been developed. While such systems work well, further improvements are needed. For example, current rinsing systems discharge the rinse liquid onto the ground.

Accordingly, an improved system and method for performing rinsing operations on an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for performing rinsing operations on an agricultural sprayer. The system includes a product tank configured to store a liquid agricultural product and a rinse tank configured to store a rinse liquid. Additionally, the system includes a boom assembly comprising a nozzle configured to receive and deliver the liquid agricultural product to a field. Furthermore, the system includes a feed conduit extending from the product tank and the rinse tank to the boom assembly. The feed conduit is configured to convey the liquid agricultural product and the rinse liquid to the nozzle of the boom assembly. Moreover, the system includes a recirculation conduit extending from the boom assembly to the product tank. The recirculation conduit is configured to convey the rinse liquid from the boom assembly to the product tank. Additionally, the system includes a pump arranged between the boom assembly and the product tank and the rinse tank. The pump is configured to pump at least one of the liquid agricultural product and the rinse liquid through the feed conduit and the recirculation conduit. Furthermore, the system includes a plurality of valves, each valve of the plurality of valves arranged on the feed conduit or the recirculation conduit. Each valve of the plurality of valves is configured to regulate the flow of the liquid agricultural product and the rinse liquid through the feed conduit and the recirculation conduit. Moreover, the system includes a computing system. The computing system is configured to receive an input to initiate a rinse cycle. Additionally, upon receipt of the input, the computing system is permitted to flow through the recirculation conduit from the boom assembly to the product tank. Furthermore, upon receipt of the input, the computing system is configured to activate the pump for a duration of time of the rinse cycle such that the rinse liquid is conveyed through the feed conduit to the boom assembly and through the recirculation conduit from the boom assembly to the product tank.

In another aspect, the present subject matter is directed to a method for performing rinsing operations on an agricultural sprayer. The method includes receiving, with a computing system, an input to initiate a rinse cycle. Additionally, upon receipt of the input, the method includes controlling, with the computing system, an operation of a plurality of valves such that a rinse liquid is permitted to flow through a recirculation conduit from a boom assembly to a product tank. Furthermore, upon receipt of the input, the method includes, activating, with the computing system, a pump for a duration of time of the rinse cycle such that the rinse liquid is conveyed through the feed conduit to the boom assembly and through the recirculation conduit from the boom assembly to the product tank.

In another aspect, the present subject matter is directed to an agricultural sprayer. The agricultural sprayer includes a frame, a product tank supported by the frame and configured to store a liquid agricultural product, and a rinse tank supported by the frame and configured to store a rinse liquid. Additionally, the agricultural sprayer includes a boom assembly supported by the frame and comprising a nozzle configured to receive and deliver the liquid agricultural product to a field. Furthermore, the agricultural sprayer includes a feed conduit extending from the product tank and the rinse tank to the boom assembly. The feed conduit is configured to convey the liquid agricultural product and the rinse liquid to the nozzle of the boom assembly. Moreover, the agricultural sprayer includes a recirculation conduit extending from the boom assembly to the product tank. The recirculation conduit is configured to convey the rinse liquid from the boom assembly to the product tank. Additionally, the agricultural sprayer includes a pump arranged between the boom assembly and the product tank and the rinse tank. The pump is configured to pump at least one of the liquid agricultural product or the rinse liquid through the feed conduit and the recirculation conduit. Furthermore, the agricultural sprayer includes a plurality of valves, each valve of the plurality of valves arranged on the feed conduit or the recirculation conduit. Each valve of the plurality of valves is configured to regulate the flow of the liquid agricultural product and the rinse liquid through the feed conduit and the recirculation conduit. Moreover, the agricultural sprayer includes a computing system. The computing system is configured to receive an input to initiate a rinse cycle. Additionally, upon receipt of the input, the computing system is configured to control the plurality of valves such that the rinse liquid is permitted to flow through the recirculation conduit from the boom assembly to the product tank. Furthermore, upon receipt of the input, the computing system is configured to activate the pump for a duration of time of the rinse cycle such that the rinse liquid is conveyed through the feed conduit to the boom assembly and through the recirculation conduit from the boom assembly to the product tank.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
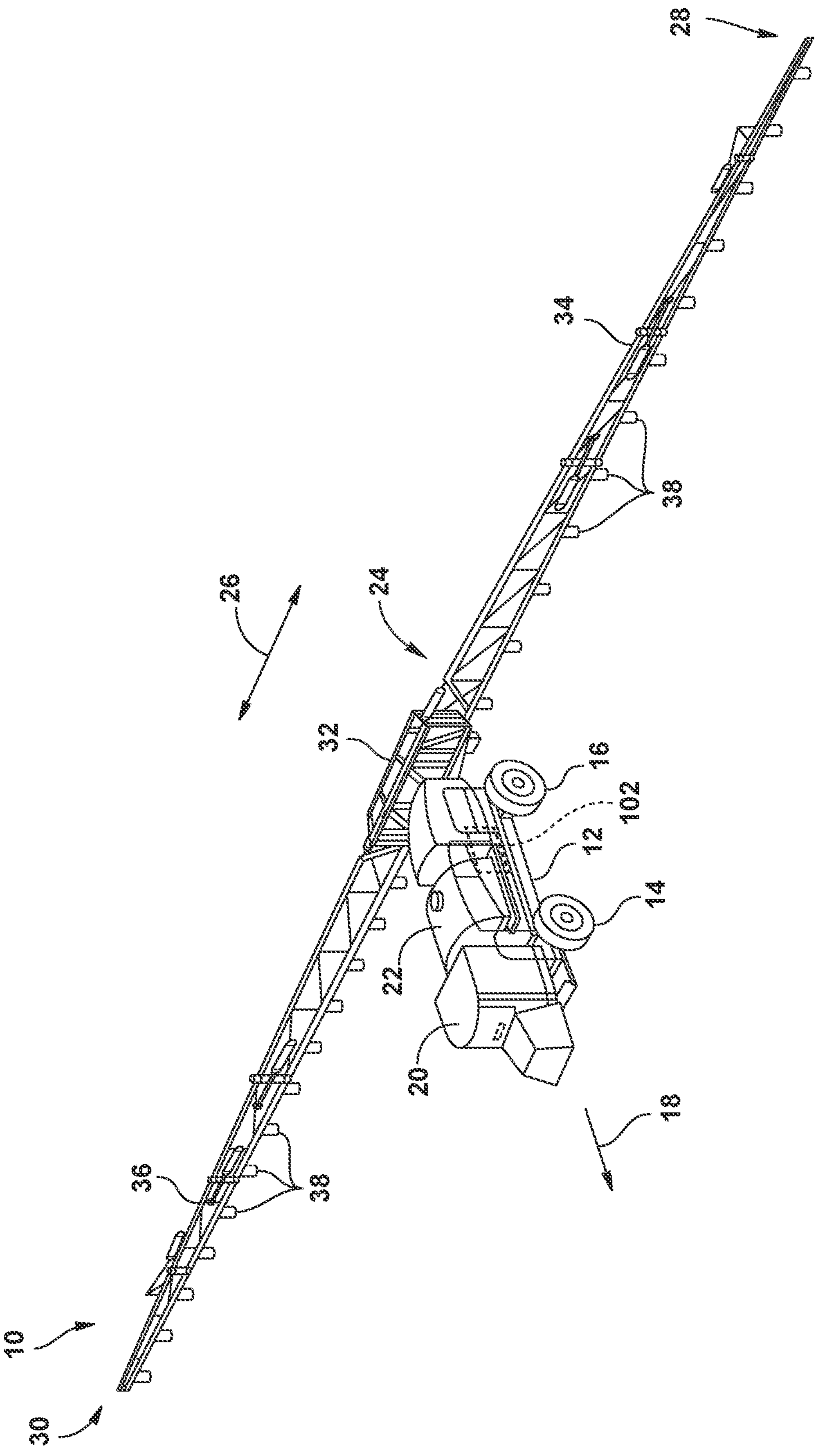
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for performing rinsing operations on an agricultural sprayer. As will be described below, the agricultural sprayer includes a product tank configured to store a liquid agricultural product (e.g., a pesticide, nutrient, etc.) and a rinse tank configured to store a rinse liquid (e.g., water). Additionally, the agricultural sprayer includes a boom assembly including one or more nozzles configured to receive and deliver the liquid agricultural product and the rinse liquid to a field.

The boom assembly is fluidly coupled to the product tank and/or the rinse tank through one or more fluid conduits such that the liquid agricultural product and the rinse liquid may be conveyed to and from the boom assembly. For example, the agricultural sprayer may include a feed conduit extending from the product tank and the rinse tank to the boom assembly and configured to convey the liquid agricultural product and the rinse liquid to the nozzles of the boom assembly. Furthermore, the agricultural sprayer includes a recirculation conduit extending from the boom assembly to the product tank and configured to convey the rinse liquid from the boom assembly to the product tank. Furthermore, the agricultural sprayer includes a pump arranged between the boom assembly and the product tank and the rinse tank. The pump is configured to pump at least one of the liquid agricultural product or the rinse liquid through the feed conduit and configured to pump the rinse liquid through the recirculation conduit. Moreover, the agricultural sprayer includes a plurality of valves. Each valve may be arranged on the feed conduit or the recirculation conduit. Additionally, each valve is configured to regulate the flow of liquid agricultural product and the rinse liquid through the feed conduit and the recirculation conduit.

Furthermore, a computing system of the agricultural sprayer is configured to initiate performance of a rinsing system. Specifically, in several embodiments, the computing system is configured to receive an input to initiate a rinse cycle. For example, the computing system may receive an input from an operator of the agricultural sprayer via a user interface. Moreover, upon receipt of the input to initiate the rinse cycle, the computing system is configured to control an operation of the plurality of valves such that the rinse liquid is permitted to flow through the recirculation conduit from the boom assembly to the product tank. For example, upon receipt of the input to initiate the rinse cycle, the computing system may be configured to initiate closing the boom assembly valves and initiate opening the recirculation valves. Additionally, upon receipt of the input to initiate the rinse cycle, the computing system may be configured to activate the pump for a duration of time of the rinse cycle such that the rinse liquid is conveyed through the feed conduit to the boom assembly and through the recirculation conduit from the boom assembly to the product tank.

The disclosed system and method for performing rinse operations on an agricultural sprayer prevents harmful liquids from being drained onto the ground thereby harming the environment. More specifically, rinse liquid delivered to the boom that is unused is drained from the system instead of being recycled back into the system, such as back into a product storing tank, to be safely stored until proper disposal. As such, the disclosed system and method for performing rinsing operations on an agricultural sprayer includes a recirculation conduit extending from the boom assembly to the product tank and configured to convey the rinse liquid from the boom assembly to the product tank. In this respect, any rinse liquid used to rinse components such as the feed conduit and the boom assembly may be used to rinse the recirculation conduit and the product tank during rinsing operations and also be safely stored until proper disposal instead of being drained onto the ground and harming the environment. Moreover, the disclosed system and method includes a computing system to automatically activate the pump and control a plurality of valves upon receipt of an input to initiate a rinse cycle. As such, the rinse liquid is conveyed through the recirculation conduit from the boom assembly to the product tank for a duration of time of the rinse cycle. In this respect, the operator of the agricultural sprayer does not need to manually and time multiple valves to run the rinse liquid through the conduits.

Referring now to drawings, FIG. 1 illustrates a perspective view of one embodiment of an agricultural sprayer 10 in accordance with aspect of the present subject matter. As shown, in the illustrated embodiment, the agricultural sprayer 10 is configured as a self-propelled sprayer. However, in alternative embodiments, the agricultural sprayer 10 may be configured as any other suitable agricultural equipment that dispenses an agricultural fluid (e.g., a pesticide or a nutrient) while traveling across a field, such as a towable sprayer.

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and a product tank 22 configured to store or hold a liquid agricultural product, such as a pesticide (e.g., a herbicide, an insecticide, a rodenticide, and/or the like), a fertilizer, or a nutrient. Moreover, the frame 12 may support a rinse tank 102 configured to store or hold a rinse liquid, such as water or another suitable rinse liquid. However, in alternative embodiments, the agricultural sprayer 10 may have any other suitable configuration. For example, in one embodiment, the front wheels 14 of the sprayer 10 may be driven in addition to or in lieu of the rear wheels 16.

Additionally, the agricultural sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Furthermore, one or more nozzle(s) 38 may be supported on the boom assembly 24. Each nozzle(s) 38 may, in turn, be configured to dispense the liquid agricultural product stored in the product tank 22 onto the underlying field. However, in alternative embodiments, the boom assembly 24 may have any other suitable configuration.

It should be further appreciated that the configuration of the agricultural sprayer 10 described above and shown in FIG. 1 is provided only to place the present subject matter in an exemplary field of use. Thus, it should be appreciated that the present subject matter may be readily adaptable to any manner of agricultural sprayer configuration.

Figure 2:
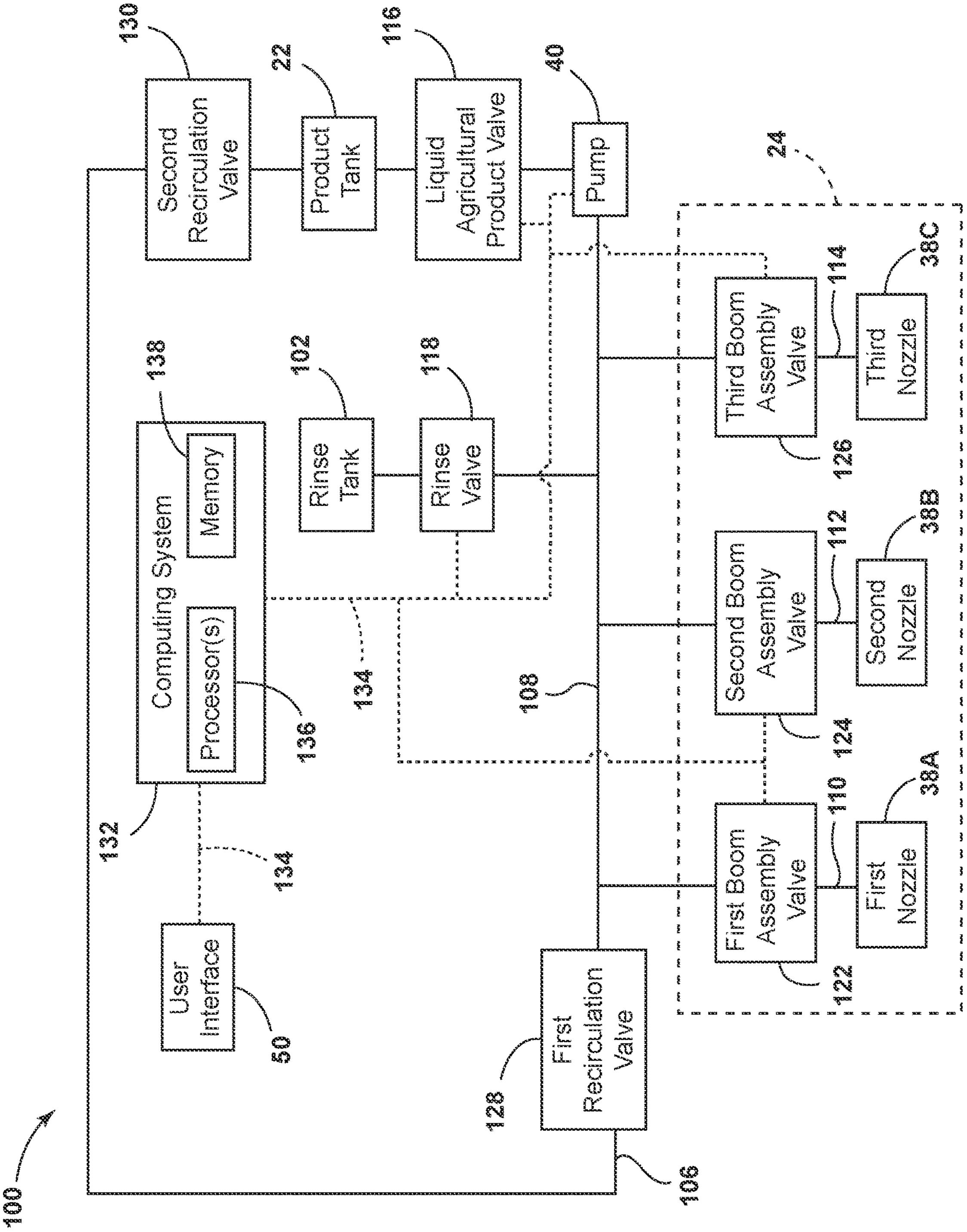
FIG. 2 illustrates a schematic view of one embodiment of a system for performing rinsing operations on an agricultural sprayer in accordance with aspects of the present subject matter.

Referring now to FIG. 2, a schematic view of one embodiment of a system 100 for performing rinsing operations on an agricultural sprayer 10 is illustrated in accordance with aspects of the present subject matter. In general, the system 100 will be described herein with reference to the agricultural sprayer 10 described above with reference to FIG. 1. However, it should be appreciated by those of ordinary skill in the art that the disclosed system 100 may generally be utilized with agricultural sprayers having any other suitable configuration.

In several embodiments, the system 100 may include the nozzle(s) 38 supported on the boom assembly 24 of the agricultural sprayer 10. In general, and as described above, the nozzle(s) 38 may be configured to dispense the agricultural fluid stored within the product tank 22 onto the underlying field. For example, as shown in FIG. 2, in the illustrated embodiment, the system 100 includes a first nozzle 38A, a second nozzle 38B, and third nozzle 38C. However, in alternative embodiments, the system 100 may have any other suitable number of nozzles. For example, in some embodiments, the system 100 may include fifty or more nozzles.

As shown in FIG. 2, the system 100 also includes one or more tanks of the agricultural sprayer 10. In general, the tank(s) may store various fluids for use during and/or after the performance of a spraying operation. For example, in the illustrated embodiment, the system 100 includes the product tank 22. As mentioned above, the product tank 22 may be configured to store a liquid agricultural product (e.g., a pesticide) to be applied to a field via the nozzle(s) 38. Additionally, in the illustrated embodiment, the system 100 includes the rinse tank 102. In general, the rinse tank 102 may be configured to store a rinse liquid (e.g., water) that may be used to rinse various components of the system 100, such as the nozzle(s) 38 (and the associated liquid conduits) after completion of a spraying operation.

Furthermore, the system 100 includes various liquid conduits of the agricultural sprayer 10. For example, in several embodiments, the system 100 may include one or more feed conduits 108 that extends from and fluidly coupled to the product tank 22 and the rinse tank 102. The feed conduit(s) 108 also extends to and is fluidly coupled to the nozzle(s) 38 of the boom assembly 24. Additionally, in several embodiments, the liquid conduits of the system 100 may include first, second, and third liquid conduits 110, 112, 114. Specifically, the first liquid conduit 110 may be fluidly coupled between the feed conduit(s) 108 and the first nozzle 38A. Moreover, the second liquid conduit 112 may be fluidly coupled between the feed conduit(s) 108 and the second nozzle 38B. In addition, the third liquid conduit 114 may be fluidly coupled between the feed conduit(s) 108 and the third nozzle 38C. Thus, liquid agricultural product from the product tank 22 and/or the liquid from the rinse tank 102 may be supplied to the nozzle(s) 38 via the feed conduit(s) 108 and the first, second, and third liquid conduits 110, 112, 114. However, it should be appreciated that the system 100 may include any number of nozzle(s) 38 and corresponding number of liquid conduits fluidly coupled thereto.

Moreover, in some embodiments, the system 100 includes a recirculation conduit 106 that extends from and is fluidly coupled to the nozzle(s) 38 of the boom assembly 24 and extends to and is fluidly coupled to the product tank 22. Thus, unused liquid agricultural product from the product tank 22 that is not distributed through the nozzle(s) 38 to the field surface may be recirculated back into the product tank 22 via the recirculation conduit 106. In this respect, the liquid agricultural product first passes from the product tank 22 through the feed conduit(s) 108 to the nozzle(s) 38 of the boom assembly 24, then the liquid agricultural product passes from the boom assembly 24 through the recirculation conduit 106 and back into the product tank 22. Furthermore, the rinse liquid from the rinse tank 102 may be discharged to the product tank 22 via the recirculation conduit 106 during rinsing operations in order to rinse any residual liquid agricultural product from the recirculation conduit 106 and the product tank 22. In this respect, the rinse liquid first passes from the rinse tank 102 through the feed conduit(s) 108 to the nozzle(s) 38 of the boom assembly 24, then the rinse liquid passes from the boom assembly 24 through the recirculation conduit 106 to and into the product tank 22.

Further, in some embodiments, the system 100 includes a pump 40 arranged between the boom assembly 24 and the product tank 22 and the rinse tank 102. The pump 40 is fluidly coupled to the feed conduit(s) 108. As such, the pump 40 is configured to pump at least one of the liquid agricultural product or the rinse liquid through the feed conduit(s) 108 from the product tank 22 and the rinse tank 102, respectively, to the nozzle(s) 38. Furthermore, the pump 40 is fluidly coupled to the recirculation conduit 106. As such, the pump 40 is configured to pump the rinse liquid through the recirculation conduit 106 from the boom assembly 24 to and into the product tank 22 during rinsing operations.

Additionally, the system 100 includes a plurality of valves. Each valve of the plurality of valves may be arranged on the feed conduit(s) 108, the recirculation conduit 106, or the boom assembly 24. Each valve may also be configured to control fluid flow through each of the feed conduit(s) 108, the recirculation conduit 106, and/or the nozzle(s) 38. For example, one or more valves may be arranged on the feed conduit(s) 108 and configured to control the flow of the liquid agricultural product and/or rinse liquid into the feed conduit(s) 108. In several embodiments, the system 100 may include a liquid agricultural product valve 116 arranged on the feed conduit(s) 108 and a rinse valve 118 arranged on the feed conduit(s) 108. Specifically, the liquid agricultural product valve 116 may be configured to selectively permit liquid agricultural product from the product tank 22 to flow through the feed conduit(s) 108. In this respect, the liquid agricultural product valve 116 may be configured to prevent liquid from the rinse tank 102 from flowing into the product tank 22 during rinsing operations. Moreover, the rinse valve 118 may be configured to selectively permit liquid from the rinse tank 102 to flow through the feed conduit(s) 108. In this respect, the rinse valve 118 may be configured to prevent liquid agricultural product from the product tank 22 from flowing into rinse tank 102 during spraying operations.

Moreover, the system 100 may include one or more valves arranged on the boom assembly 24 and configured to control the flow of the liquid agricultural product and/or rinse liquid to the nozzle(s) 38. Specifically, in several embodiments, the system 100 may include a first boom assembly valve 122 coupled between the feed conduit(s) 108 and the first liquid conduit 110. In this respect, the first boom assembly valve 122 may be configured to selectively permit the liquid agricultural product and/or rinse liquid from the feed conduit (s) 108 to flow to the first nozzle 38A. For example, the first boom assembly valve 122 may be moveable between an open position at which delivery of the liquid agricultural product and the rinse liquid to the first nozzle 38A of the boom assembly 24 is permitted and a closed position at which delivery of the liquid agricultural product and the rinse liquid to the first nozzle 38A of the boom assembly 24 is prevented.

Furthermore, in several embodiments, the system 100 may include a second boom assembly valve 124 coupled between the feed conduit(s) 108 and the second liquid conduit 112. As such, the second boom assembly valve 124 may be configured to selectively permit the liquid agricultural product and/or rinse liquid from the feed conduit(s) 108 to flow to the second nozzle 38B. For example, the second boom assembly valve 124 may be moveable between an open position at which delivery of the liquid agricultural product and the rinse liquid to the second nozzle 38B of the boom assembly 24 is permitted and a closed position at which delivery of the liquid agricultural product and the rinse liquid to the second nozzle 38B of the boom assembly 24 is prevented.

In addition, in several embodiments, the system 100 may include a third boom assembly valve 126 coupled between the feed conduit(s) 108 and the third liquid conduit 114. Thus, the third boom assembly valve 126 may be configured to selectively permit the liquid agricultural product and/or rinse liquid from the feed conduit(s) 108 to flow to the third nozzle 38C. For example, the third boom assembly valve 126 may be moveable between an open position at which delivery of the liquid agricultural product and the rinse liquid to the third nozzle 38C of the boom assembly 24 is permitted and a closed position at which delivery of the liquid agricultural product and the rinse liquid to the third nozzle 38C of the boom assembly 24 is prevented. However, it should be appreciated that the same configuration described above could apply to any suitable valve arranged on the boom assembly 24.

Furthermore, the system 100 includes one or more valves of the plurality of valves arranged on the recirculation conduit 106 and configured to control the flow of the rinse liquid through the recirculation conduit 106 and/or to the product tank 22. Specifically, in several embodiments, the system 100 may include a first recirculation valve 128 coupled between the boom assembly 24 and the product tank 22 adjacent to the boom assembly 24. In this respect, the first recirculation valve 128 may be configured to selectively permit the liquid agricultural product and/or rinse liquid from the boom assembly 24 to flow into the recirculation conduit 106. For example, the first recirculation valve 128 may be moveable between an open position at which delivery of the liquid agricultural product and the rinse liquid into the recirculation conduit 106 is permitted and a closed position at which delivery of the liquid agricultural product and the rinse liquid into the recirculation conduit 106 is prevented.

Additionally, in several embodiments, the system 100 may include a second recirculation valve 130 coupled between the boom assembly 24 and the product tank 22 adjacent to the product tank 22. In this respect, the second recirculation valve 130 may be configured to selectively permit the liquid agricultural product and/or rinse liquid from the recirculation conduit 106 to flow into the product tank 22. For example, the second recirculation valve 130 may be moveable between an open position at which delivery of the liquid agricultural product and the rinse liquid into the product tank 22 is permitted and a closed position at which delivery of the liquid agricultural product and the rinse liquid into the product 22 is prevented.

It should be appreciated that the system 100 may include any other suitable number of valves arranged in any suitable location for controlling the flow of the liquid agricultural product and/or rinse liquid to the nozzles.

In accordance with aspects of the present subject matter, the system 100 may include a computing system 132 communicatively coupled to one or more components of the agricultural sprayer 10 and/or the system 100 to allow the operation of such components to be electronically or automatically controlled by the computing system 132. For example, the computing system 132 may be communicatively coupled to the various valves 116, 118, 122, 124, 126, 128, 130 of the agricultural sprayer 10 via a communicative link 134. In this respect, the computing system 132 may be configured to control the operation of such valves 116, 118, 122, 124, 126, 128, 130 in a manner that moves the valves between opened and closed positions to control the flow of the liquid agricultural product and rinse liquid into the feed conduit(s) 108, to the nozzle(s) 38, into the recirculation conduit 106, and/or into the product tank 22. Moreover, the computing system 132 may be communicatively coupled to the pump 40. In this respect, the computing system 132 may be configured to control the operation of the pump 40, such as activating/deactivating the pump 40. Additionally, the computing system 132 may be communicatively coupled to any other suitable components of the agricultural sprayer 10 and/or the system 100.

Moreover, the user interface 50 may be in the form of a human-machine interface (HMI), an electronic device, and/or an imaging system. The interface element(s) of the user interface 50 may include a touchscreen capable of displaying information related to the rinse cycle or any other information through a graphical user interface (and/or through any other manner). In some embodiments, the interface element(s) of the user interface 50 may include a user input device in the form of circuitry within the touch-screen to receive an input corresponding with a location over the touchscreen. Other forms of interface elements, including one or more joysticks, digital input pads, or the like can be used in place or in addition to the touchscreen. In addition to the touchscreen, some embodiments of the user interface 50 may also include one or more additional feedback devices, such as speakers, warning lights, and/or the like, which are configured to provide feedback from the computing system 132 to the user.

In general, the computing system 132 may comprise one or more processor-based devices, such as a given controller or computing device or any suitable combination of controllers or computing devices. Thus, in several embodiments, the computing system 132 may include one or more processor(s) 136 and associated memory device(s) 138 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 138 of the computing system 132 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 138 may generally be configured to store suitable computer-readable instructions that, when implemented by the processor(s) 136, configure the computing system 132 to perform various computer-implemented functions, such as one or more aspects of the methods and algorithms that will be described herein. In addition, the computing system 132 may also include various other suitable components, such as a communications circuit or module, one or more input/output channels, a data/control bus and/or the like.

The various functions of the computing system 132 may be performed by a single processor-based device or may be distributed across any number of processor-based devices, in which instance such devices may be considered to form part of the computing system 132. For instance, the functions of the computing system 132 may be distributed across multiple application-specific controllers or computing devices, such as a navigation controller, an engine controller, a transmission controller, a spray controller, and/or the like.

Additionally, the system 100 may include a user interface 50 communicatively coupled to the computing system 132. In general, a user may input commands through the user interface 50 to control various aspects of the agricultural sprayer 10. For example, the user interface 50 may include inputs that allow an operator of the agricultural sprayer 10 to configure one or more aspects of the rinse cycle. In this respect, the user interface 50 may include one or more interface elements configured to receive an input from the operator that is indicative of a selected duration of the rinse cycle, a selected number of rinse cycles to be completed, etc.

Figure 3:
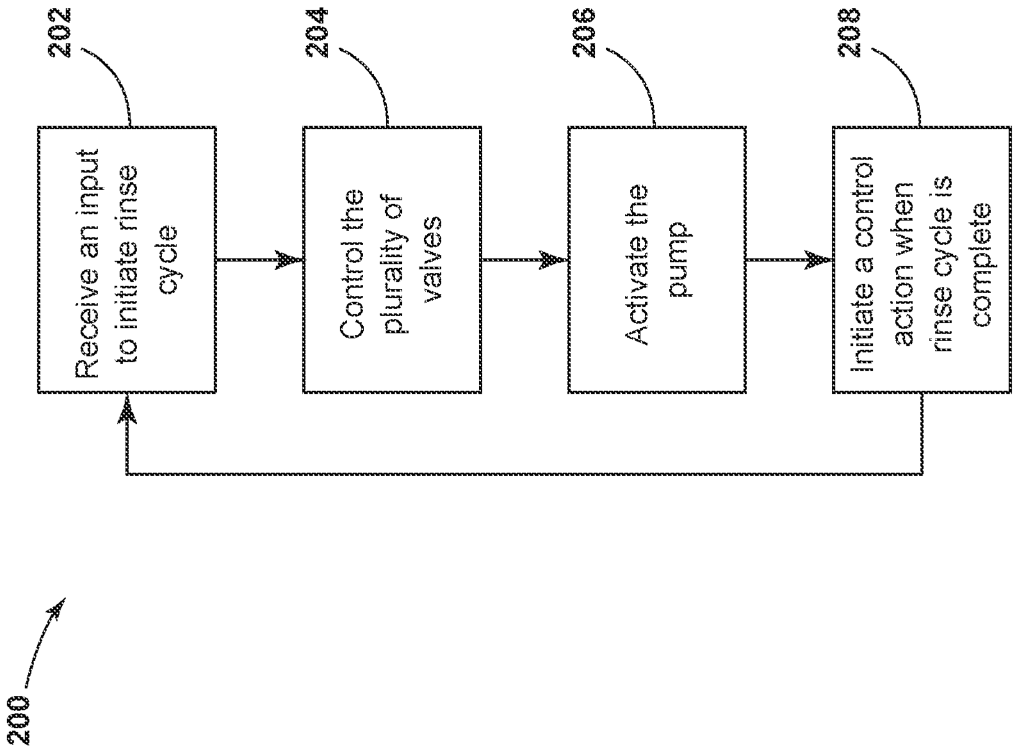
FIG. 3 illustrates a flow diagram providing one embodiment of control logic for performing rinsing operations on an agricultural sprayer in accordance with aspects of the present subject matter.

Referring now to FIG. 3, a flow diagram providing one embodiment of control logic 200 for performing rinsing operations on an agricultural sprayer 10 is illustrated in accordance with aspects of the present subject matter. Specifically, the control logic 200 shown in FIG. 3 is representative of steps of one embodiment for performing rinsing operations on an agricultural sprayer such that liquid agricultural product and debris are rinsed out of the recirculation conduit 106 and the product tank 22 and harmful rinse liquid is safely retained within the agricultural sprayer until proper disposal. In general, the control logic 200 will be described herein with reference to the agricultural sprayer 10 described above with reference to FIG. 1. However, it should be appreciated by those of ordinary skill in the art that the disclosed control logic 200 may generally be utilized with agricultural sprayers having any other suitable configuration.

As shown, at (202), the control logic 200 includes receiving an input to initiate a rinse cycle. Specifically, as mentioned above, in several embodiments, the computing system 132 is communicatively coupled to the user interface 50 via the communicative link 134. As such, the operator of the agricultural sprayer 10 may provide one or more inputs to the user interface 50, for example, via a touchscreen of an HMI, to initiate the rinse cycle. Such commands are then transmitted to the computing system 132 via the communicative link 134. Such inputs may be indicative of starting a rinse cycle, the duration of the rinse cycle, the number of rinse cycles to be completed, etc.

Additionally, at (204), upon receipt of the input at (202), the control logic 200 includes controlling the plurality of valves such that the rinse liquid is permitted to flow through the recirculation conduit from the boom assembly to the product tank. For example, upon receipt of the input at (202), the control logic 200 may be configured to initiate closing the first, second, and third boom assembly valves 122, 124, 126. As such, the rinse liquid may be conveyed past, and not through, the nozzles 38A-C. Furthermore, upon receipt of the input at (202), the control logic 200 may be configured to initiate opening the first recirculation valve 128 and the second recirculation valve 130. As such, the rinse liquid may be conveyed from the boom assembly 24 (e.g., past the nozzle(s) 38) into and through the recirculation conduit 106, and from the recirculation conduit 106 into the product tank 22.

Furthermore, at (206), upon receipt of the input at (202), the control logic 200 includes activating the pump for a duration of time of the rinse cycle such that the rinse liquid is conveyed through the feed conduit to the boom assembly and through the recirculation conduit from the boom assembly to the product tank. As mentioned previously, the computing system 132 is communicatively coupled to the pump 40, and, as such, configured to control the operation of the pump 40. As such, upon receipt of the input at (202), the computing system 132 may activate the pump 40 for the duration of time of the rinse cycle. The duration of time of the rinse cycle may be input by the operator at (202) via, for example, the touch screen of the HMI. Furthermore, while the pump 40 is activated, the pump 40 pumps the rinse liquid through the feed conduit(s) 108 from the product tank 22 and the rinse tank 102 to the nozzle(s) 38 of the boom assembly 24. Additionally, while the pump 40 is activated, the pump 40 pumps the rinse liquid through the recirculation conduit 106 from the boom assembly 24 (e.g., the nozzle(s) 38) to and into the product tank 22.

Moreover, at (208), the control logic 200 includes initiating a control action when the rinse cycle is complete. For example, the computing system 132 may be configured to initiate one or more control actions when the rinse cycle is complete. As such, the control action(s) may include notifying the operator of the agricultural sprayer 10 that the rinse cycle is complete. For example, as mentioned previously, the computing system 132 is communicatively coupled to the user interface 50. When the rinse cycle is complete, the computing system 132 may transmit feedback signals to the user interface 50. Such feedback signals, in turn, instruct the user interface to provide feedback (e.g., a visual and/or audible notification) to the operator when the rinse cycle is complete. Moreover, the control action(s) may include deactivating the pump 40. As such, upon deactivation, the rinse liquid will not be conveyed by the pump 40. After the control action at (208) has been initiated, the control logic 200 returns to (202).

Figure 4:
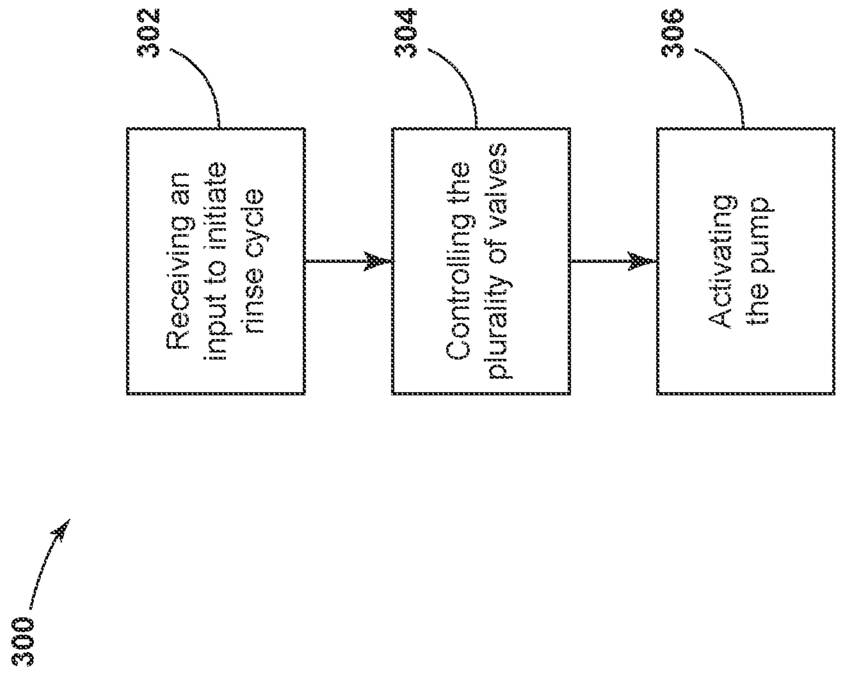
FIG. 4 illustrates a flow diagram of one embodiment of a method for performing rinsing operations on an agricultural sprayer in accordance with aspects of the present subject matter.

Referring now to FIG. 4, a flow diagram of one embodiment of a method 300 for performing rinsing operations on an agricultural sprayer 10 is illustrated in accordance with aspects of the present subject matter. In general, the method 300 will be described herein with reference to the agricultural sprayer 10 described above with reference to FIG. 1. However, it should be appreciated by those of ordinary skill in the art that the disclosed method 300 may generally be utilized with agricultural sprayers having any other suitable configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 4, at (302), the method 300 includes receiving, with a computing system, an input to initiate a rinse cycle. For example, in several embodiments, the computing system 132 may be configured to receive one or more inputs associated within initiating a rinse cycle on the agricultural sprayer 10, such as via the user interface 50.

Additionally, at (304), upon receipt of the input, the method 300 includes controlling, with the computing system, an operation of a plurality of valves such that a rinse liquid is permitted to flow through a recirculation conduit from a boom assembly to a product tank.

Furthermore, at (306), upon receipt of the input, the method 300 includes activating, with the computing system, a pump for a duration of time of the rinse cycle such that the rinse liquid is conveyed through the feed conduit to the boom assembly and through the recirculation conduit from the boom assembly to the product tank.

It is to be understood that some of the control logic 200 is performed by the computing system 132 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 132 described herein, such as the control logic 200, is implemented in software code or instructions which are tangibly stored on a tangible computer readable medium. The computing system 132 loads the software code or instructions via a direct interface with the computer readable medium or via a wired and/or wireless network. Upon loading and executing such software code or instructions by the computing system 132, the computing system 132 may perform any of the functionality of the computing system 132 described herein, including the control logic 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for performing rinsing operations on an agricultural sprayer, the system comprising:

- a product tank configured to store a liquid agricultural product;
- a rinse tank configured to store a rinse liquid;
- a boom assembly comprising a nozzle configured to receive and deliver the liquid agricultural product to a field;
- a feed conduit extending from the product tank and the rinse tank to the boom assembly and configured to convey at least one of the liquid agricultural product and or the rinse liquid to the nozzle of the boom assembly;
- a recirculation conduit extending from the boom assembly to the product tank and configured to convey the at least one of the liquid agricultural product or the rinse liquid from the boom assembly to the product tank;
- a pump arranged between the boom assembly and the product tank and the rinse tank and configured to pump the at least one of the liquid agricultural product or the rinse liquid through the feed conduit and through the recirculation conduit;
- a plurality of valves, each valve of the plurality of valves arranged on the feed conduit or the recirculation conduit and configured to regulate a flow of the at least one of the liquid agricultural product or the rinse liquid through the feed conduit and the recirculation conduit, the plurality of valves comprising:
  - a boom assembly valve moveable between an open position at which delivery of the at least one of the liquid agricultural product or the rinse liquid to the nozzle of the boom assembly is permitted and a closed position at which delivery of the at least one of the liquid agricultural product or the rinse liquid to the nozzle is prevented; and
  - a recirculation valve moveable between an open position at which a flow of the at least one of the liquid agricultural product or the rinse liquid through at least a portion of the recirculation conduit is permitted and a closed position at which the flow of the at least one of the liquid agricultural product or the rinse liquid through the at least the portion of the recirculation conduit is prevented; and a computing system configured for:

receiving an input to initiate a rinse cycle;

controlling an operation of the plurality of valves such that the rinse liquid is permitted to flow through the recirculation conduit from the boom assembly to the product tank in response to the input to initiate the rinse cycle, wherein controlling the operation of the plurality of valves comprises:

closing the boom assembly valve; and opening the recirculation valve together with closing the boom assembly valve; and activating the pump for a duration of time of the rinse cycle while the boom assembly valve is closed and the recirculation valve is open, wherein the rinse liquid is conveyed through the feed conduit to the boom assembly and through the recirculation conduit from the boom assembly to the product tank while being prevented from being dispensed by the nozzle.

2. The system of claim 1, the computing system further comprising:

a user interface configured to receive an input from an operator of the agricultural sprayer associated with the rinse cycle.

3. The system of claim 2, wherein the user interface includes one or more interface elements configured to receive an input from the operator that is indicative of a selected duration of time for the rinse cycle.

4. The system of claim 2, wherein the user interface includes one or more interface elements configured to receive an input from the operator that is indicative of a selected number of rinse cycles to be completed.

5. The system of claim 2, wherein the user interface is a Human Machine Interface (HMI).

6. The system of claim 1, wherein the computing system is further configured for initiating a control action when the rinse cycle is complete.

7. The system of claim 6, wherein the control action comprises notifying an operator of the agricultural sprayer that the rinse cycle is complete.

8. The system of claim 6, wherein the control action comprises deactivating the pump.

9. A method for performing rinsing operations on an agricultural sprayer, the method comprising:

receiving, with a computing system, an input to initiate a rinse cycle;

controlling, with the computing system, an operation of a plurality of valves such that a rinse liquid is permitted to flow through a recirculation conduit from a boom assembly to a product tank in response to the input to initiate the rinse cycle, wherein controlling the operation of the plurality of valves comprises:

closing, with the computing system, a boom assembly valve of the plurality of valves; and opening, with the computing system, a recirculation valve of the plurality of valves together with closing the boom assembly valve; and activating, with the computing system, a pump for a duration of time of the rinse cycle while the boom assembly valve is closed and the recirculation valve is open, wherein the rinse liquid is conveyed through the feed conduit to the boom assembly and through the recirculation conduit from the boom assembly to the product tank while being prevented from being dispensed by a nozzle of the boom assembly.

10. The method of claim 9, further comprising:

initiating, with the computing system, a control action when the rinse cycle is complete.

11. An agricultural sprayer, comprising:

a frame;

a product tank supported by the frame and configured to store a liquid agricultural product;

a rinse tank supported by the frame and configured to store a rinse liquid;

a boom assembly supported by the frame, the boom assembly comprising a nozzle configured to receive and deliver the liquid agricultural product to a field;

a feed conduit extending from the product tank and the rinse tank to the boom assembly and configured to convey at least one of the liquid agricultural product and or the rinse liquid to the nozzle of the boom assembly;

a recirculation conduit extending from the boom assembly to the product tank and configured to convey the at least one of the liquid agricultural product or the rinse liquid from the boom assembly to the product tank;

a pump arranged between the boom assembly and the product tank and the rinse tank and configured to pump the at least one of the liquid agricultural product or the rinse liquid through the feed conduit and through the recirculation conduit;

a plurality of valves configured to regulate a flow of the at least one of the liquid agricultural product or the rinse liquid through the feed conduit and the recirculation conduit, the plurality of valves comprising:

a boom assembly valve moveable between an open position at which delivery of the at least one of the liquid agricultural product or the rinse liquid to the nozzle of the boom assembly is permitted and a closed position at which delivery of the at least one of the liquid agricultural product or the rinse liquid to the nozzle is prevented; and a recirculation valve moveable between an open position at which a flow of the at least one of the liquid agricultural product or the rinse liquid through at least a portion of the recirculation conduit is permitted and a closed position at which the flow of the at least one of the liquid agricultural product or the rinse liquid through the at least the portion of the recirculation conduit is prevented; and a computing system configured for:

receiving an input to initiate a rinse cycle;

controlling an operation of the plurality of valves such that the rinse liquid is permitted to flow through the recirculation conduit from the boom assembly to the product tank in response to the input to initiate the rinse cycle, wherein controlling the operation of the plurality of valves comprises:

closing the boom assembly valve; and opening the recirculation valve together with closing the boom assembly valve; and activating the pump for a duration of time of the rinse cycle while the boom assembly valve is closed and the recirculation valve is open, wherein the rinse liquid is conveyed through the feed conduit to the boom assembly and through the recirculation conduit from the boom assembly to the product tank while being prevented from being dispensed by the nozzle.

12. The agricultural sprayer of claim 11, the computing system further comprising:

a user interface configured to receive an input from an operator of the agricultural sprayer associated with the rinse cycle.

13. The agricultural sprayer of claim 12, wherein the user interface includes one or more interface elements configured to receive an input from the operator that is indicative of a selected duration of time for the rinse cycle.

14. The agricultural sprayer of claim 12, wherein the user interface includes one or more interface elements configured to receive an input from the operator that is indicative of a selected number of rinse cycles to be completed.

15. The agricultural sprayer of claim 11, wherein the computing system is further configured for initiating a control action when the rinse cycle is complete.

16. The agricultural sprayer of claim 15, wherein the control action comprises notifying an operator of the agricultural sprayer that the rinse cycle is complete.

17. The agricultural sprayer of claim 15, wherein the control action comprises deactivating the pump.

18. The system of claim 1, wherein the recirculation valve is a first recirculation valve, wherein:

the first recirculation valve is positioned at the recirculation conduit;

the system further comprises a second recirculation conduit positioned at the recirculation conduit between the first recirculation valve and the product tank; and the second recirculation valve is moveable to a closed position during operation of the rinse cycle while the first recirculation valve is in the open position to permit rinsing of a portion of the recirculation conduit up to the second recirculation valve while preventing the flow of rinse liquid from entering the product tank.

19. The agricultural sprayer of claim 11, wherein the recirculation valve is a first recirculation valve, wherein:

the first recirculation valve is positioned at the recirculation conduit;

the system further comprises a second recirculation conduit positioned at the recirculation conduit between the first recirculation valve and the product tank; and the second recirculation valve is moveable to a closed position during operation of the rinse cycle while the first recirculation valve is in the open position to permit rinsing of a portion of the recirculation conduit up to the second recirculation valve while preventing the flow of rinse liquid from entering the product tank.

* * * * *